(12) United States Patent
Takeda et al.

(10) Patent No.: US 12,084,750 B2
(45) Date of Patent: Sep. 10, 2024

(54) NON-ORIENTED ELECTRICAL STEEL SHEET AND METHOD FOR MANUFACTURING SAME

(71) Applicant: NIPPON STEEL CORPORATION, Tokyo (JP)

(72) Inventors: Kazutoshi Takeda, Tokyo (JP); Minako Fukuchi, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/277,548

(22) PCT Filed: Mar. 30, 2022

(86) PCT No.: PCT/JP2022/016264
§ 371 (c)(1),
(2) Date: Aug. 16, 2023

(87) PCT Pub. No.: WO2022/210962
PCT Pub. Date: Oct. 6, 2022

(65) Prior Publication Data
US 2024/0035129 A1    Feb. 1, 2024

(30) Foreign Application Priority Data

Mar. 31, 2021    (JP) ................. 2021-060409

(51) Int. Cl.
*C22C 38/02* (2006.01)
*B05D 3/02* (2006.01)
*B05D 7/14* (2006.01)
*C21D 8/12* (2006.01)
*C22C 38/04* (2006.01)
*C22C 38/06* (2006.01)
*C23C 22/12* (2006.01)
*C23C 22/20* (2006.01)

(52) U.S. Cl.
CPC ............ *C22C 38/02* (2013.01); *B05D 3/0254* (2013.01); *B05D 7/14* (2013.01); *C21D 8/1283* (2013.01); *C22C 38/04* (2013.01); *C22C 38/06* (2013.01); *C23C 22/20* (2013.01); *B05D 2202/10* (2013.01)

(58) Field of Classification Search
None
See application file for complete search history.

(56) References Cited

U.S. PATENT DOCUMENTS

2013/0209789 A1    8/2013 Takeda et al.
2022/0316022 A1   10/2022 Fujii et al.
2022/0341043 A1   10/2022 Takeda et al.

FOREIGN PATENT DOCUMENTS

| CN | 103189544 A    | 7/2013 |
| JP | 2002249881 A * | 9/2002 |
| JP | 2008-303411 A  | 12/2008 |

(Continued)

*Primary Examiner* — Anthony M Liang
(74) *Attorney, Agent, or Firm* — Birch, Stewart, Kolasch & Birch, LLP

(57) ABSTRACT

This non-oriented electrical steel sheet includes: a base steel sheet; and an insulation coating formed on a surface of the base steel sheet, in which the insulation coating contains a metal phosphate and an organic resin, a moisture content of the insulation coating is 0.003 to 0.03 wt %, and a contact angle of water on the insulation coating is 55° to 85°.

8 Claims, 1 Drawing Sheet

(56) References Cited

FOREIGN PATENT DOCUMENTS

| | | |
|---|---|---|
| JP | 2009-155707 A | 7/2009 |
| JP | 2011-252191 A | 12/2011 |
| JP | 6816849 B1 | 1/2021 |
| WO | WO 2021/054450 A1 | 3/2021 |

* cited by examiner

NON-ORIENTED ELECTRICAL STEEL SHEET AND METHOD FOR MANUFACTURING SAME

TECHNICAL FIELD

The present invention relates to a non-oriented electrical steel sheet and a method for manufacturing the non-oriented electrical steel sheet. Priority is claimed on Japanese Patent Application No. 2021-060409, filed Mar. 31, 2021, the content of which is incorporated herein by reference.

BACKGROUND ART

Non-oriented electrical steel sheets are used for motors for driving small home appliances such as audio devices, and iron cores (motor cores (rotor cores and stator cores)) for motors for driving hybrid cars and electric cars.

An insulation coating is formed on the surface of the non-oriented electrical steel sheet. Insulation coatings, for example, ensure insulation properties between electrical steel sheets laminated as a stator core. That is, insulation coatings are preferred to have exceptional insulation properties. Insulation coatings more preferably have adhesion with respect to steel sheets. Furthermore, non-oriented electrical steel sheets are temporarily stored until they are processed into motor cores. In a case where the storage period is extended, the chances of dew condensation on non-oriented electrical steel sheets will increase. For this reason, insulation coatings preferably have not only insulation properties and adhesion but also corrosion resistance.

Insulation coatings of non-oriented electrical steel sheets have been proposed, for example, in Japanese Unexamined Patent Application, First Publication No. 2011-252191 (Patent Document 1) and Japanese Patent No. 6816849 (Patent Document 2).

An electrical steel sheet disclosed in Patent Document 1 includes, on the surface of the electrical steel sheet, an insulation coating obtained by mixing 0.3 to 5.0 parts by mass of a C8-20 fatty acid or fatty acid metal salt with 100 parts by mass of a solid content of a binder consisting of 100 parts by mass of a metal phosphate as a main component and 1 to 50 parts by mass of a mixture or copolymer of one or more of an acrylic resin, an epoxy resin, a polyester resin, and a urethane resin with an average particle diameter of 0.05 to 0.50 μm, and dispersing the mixed ingredients. Patent Document 1 describes that this insulation coating has exceptional insulation properties, adhesion, and corrosion resistance.

A non-oriented electrical steel sheet disclosed in Patent Document 2 includes a base steel sheet and a composite coating which is formed on the surface of the base steel sheet and contains a Zn-containing phosphate and an organic resin. The molar ratio of Zn in all metal components in the composite coating is 10 mol % or more. Furthermore, the amount of Zn eluted in distilled water after boiling the non-oriented electrical steel sheet in the distilled water for 20 minutes is 1.0 mg/m 2 or more. Patent Document 2 describes that this composite coating has exceptional corrosion resistance even though it does not contain expensive organic compounds represented by chromate compounds and phosphonic acids.

CITATION LIST

Patent Documents

[Patent Document 1]
    Japanese Unexamined Patent Application, First Publication No. 2011-252191
[Patent Document 2]
    Japanese Patent No. 6816849

SUMMARY OF THE INVENTION

Problems to be Solved by the Invention

Incidentally, a method for manufacturing a stator core using a non-oriented electrical steel sheet is as follows. Non-oriented electrical steel sheets are punched into a predetermined shape. The steel sheets (core blanks) after punching are laminated and fixed to manufacture a stator core. A coil is placed in a slot of the stator core. A varnish impregnation treatment is performed on the stator core on which the coil is placed. In the varnish impregnation treatment, the slot of the motor core is filled with varnish which is a liquid-like water-soluble thermosetting resin. Then, the motor core is heated to cure the varnish and fix the coil to the motor core.

During the varnish impregnation treatment, if the space between the coil and the surface of the slot of the stator core is not sufficiently filled with the varnish, the coil may not be sufficiently fixed to the stator core. Accordingly, it is preferred for the space between the coil and the slot of the stator core to be sufficiently filled with the varnish during the varnish impregnation treatment. In order for the varnish to be sufficiently filled, it is preferred for the varnish to be easily adhered to the insulation coating of the non-oriented electrical steel sheet. Hereinafter, the ease of adhesion of varnish to an insulation coating is referred to as "varnish wettability".

Furthermore, as described above, the insulation coating of the non-oriented electrical steel sheet is preferred to have exceptional corrosion resistance. Accordingly, the insulation coating of the non-oriented electrical steel sheet is preferred to have both exceptional corrosion resistance and exceptional varnish wettability.

An object of the present invention is to provide a non-oriented electrical steel sheet provided with an insulation coating having exceptional corrosion resistance and exceptional varnish wettability, and a method for manufacturing the same.

Means for Solving the Problem

A non-oriented electrical steel sheet of the present invention includes: a base steel sheet; and an insulation coating formed on a surface of the base steel sheet, in which the insulation coating contains a metal phosphate and an organic resin, a moisture content of the insulation coating is 0.003 to 0.03 wt %, and a contact angle of water on the insulation coating is 55° to 85°.

A method for manufacturing the non-oriented electrical steel sheet of the present invention includes: applying a surface treatment agent to a surface of the base steel sheet; and baking the base steel sheet to which the surface treatment agent is applied to form the insulation coating, in which the surface treatment agent contains the metal phosphate, 10.0 to 30.0 parts by mass of the organic resin in a case where an amount of the metal phosphate is 100.0 parts by mass, and 0 to 30.0 parts by mass of a curing agent in a case where the amount of the metal phosphate is 100.0 parts by mass, Inequation (1) is satisfied when the amount of the organic resin is Y parts by mass and the amount of the curing agent is Z parts by mass, and in the baking of the base steel sheet, a baking temperature is set to 200° C. or higher and lower than 260° C. and a heat treatment time is set to 15 to 30 seconds in a case where the amount of the surface treatment agent applied to the surface of the base steel sheet is less than 0.3 g/m², the baking temperature is set to 260° C. or higher and lower than 340° C. and the heat treatment time is set to 20 to 40 seconds in a case where the amount of the surface treatment agent applied is 0.3 g/m² to 1.2 g/m², and the baking temperature is set to 340° C. or higher and lower than 380° C. and the heat treatment time is set to 25 to 50 seconds in a case where the amount of the surface treatment agent applied is more than 1.2 g/m².

$$0.8 \times (Y+Z) < 0.3 \times X < 2.5 \times (Y+Z) \tag{1}$$

Here, 100.0 which is the number of parts by mass of the metal phosphate is substituted for X.

Effects of the Invention

The non-oriented electrical steel sheet according to the above-described aspect of the present invention includes an insulation coating having exceptional corrosion resistance and exceptional varnish wettability. The method for manufacturing the non-oriented electrical steel sheet according to the above-described aspect of the present invention can manufacture the non-oriented electrical steel sheet having the above-described configuration.

EMBODIMENT FOR IMPLEMENTING THE INVENTION

Figure 1:
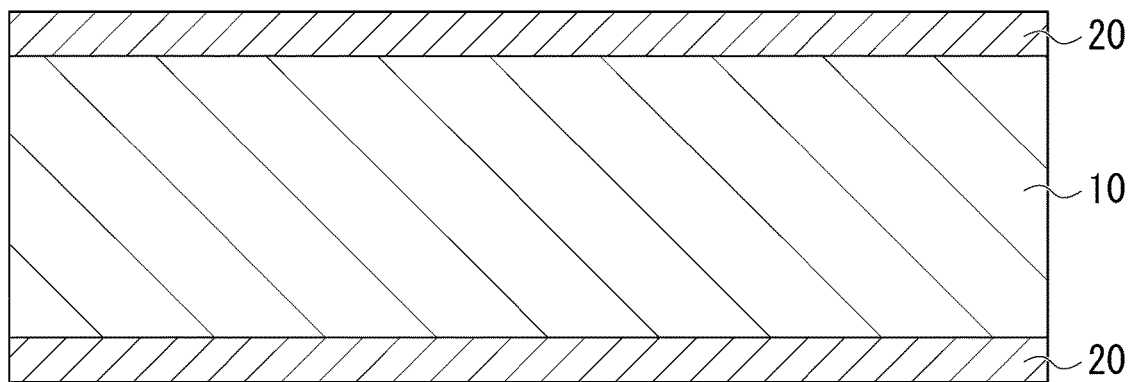
FIG. 1 is a cross-sectional view of a non-oriented electrical steel sheet of the present embodiment in the sheet thickness direction.

The present inventors have investigated and studied corrosion resistance and varnish wettability of an insulation coating of a non-oriented electrical steel sheet. The insulation coating contains a metal phosphate and an organic resin, such that the corrosion resistance can be improved.

The present inventors have studied a way to further improve the corrosion resistance of the insulation coating. As described above, the non-oriented electrical steel sheet is temporarily stored until it is processed into a core blank. Dew condensation may occur on the non-oriented electrical steel sheet during this storage period. Even if the insulation coating itself has high corrosion resistance, if dew condensation is likely to occur, there is a high likelihood that the corrosion resistance will deteriorate. It is thought that the corrosion resistance of the insulation coating of the non-oriented electrical steel sheet is further improved if the occurrence of dew condensation on the insulation coating can be suppressed. If the contact angle of water on the insulation coating is small, moisture in air is likely to condense on the insulation coating. Accordingly, from the viewpoint of suppressing the dew condensation, it is desirable to increase the contact angle of water on the insulation coating.

On the other hand, as described above, the insulation coating is preferred to have exceptional varnish wettability during a varnish impregnation treatment. The smaller the contact angle of water on the insulation coating, the more likely varnish is to blend in and spread on the surface of the insulation coating. However, if the contact angle is too small, dew condensation will occur on the surface of the insulation coating, and water will adhere to the surface thereof. In this case, water inhibits adhesion of the varnish. For this reason, the varnish wettability becomes rather low.

In addition, in a case where the moisture content of the insulation coating is too low, the varnish wettability, especially the wettability of aqueous varnish, significantly deteriorates.

On the other hand, in a case where the moisture content of the insulation coating is too high, the corrosion resistance of the non-oriented electrical steel sheet deteriorates.

Based on the above study results, the present inventors have studied the contact angle on the insulation coating and the moisture content of the insulation coating that can achieve both the corrosion resistance and the varnish wettability. As a result, it has been found that, if the insulation coating contains a metal phosphate and an organic resin, the contact angle of water measured through a sessile drop method in accordance with JIS R3257:1999 is 55° to 85°, and the moisture content of the insulation coating is 0.003 to 0.03 wt %, the occurrence of dew condensation can be suppressed to improve the corrosion resistance and the varnish wettability can be enhanced.

The non-oriented electrical steel sheet of the present embodiment has been completed based on the above-described technical ideas, and the gist thereof is as follows.

[1] A non-oriented electrical steel sheet including: a base steel sheet; and an insulation coating formed on a surface of the base steel sheet, in which the insulation coating contains a metal phosphate and an organic resin, a moisture content of the insulation coating is 0.003 to 0.03 wt %, and a contact angle of water on the insulation coating is 55° to 85°.

Here, the contact angle of water on the insulation coating is measured through a sessile drop method in accordance with JIS R3257:1999.

[2] The non-oriented electrical steel sheet according to [1], in which the metal phosphate contains one or more selected from the group consisting of Al phosphate and Zn phosphate, and the organic resin contains an epoxy resin as a main component.

Here, the expression "contains an epoxy resin as a main component" means that the amount of the epoxy resin in the organic resin is 50% or more by mass %.

[3] The non-oriented electrical steel sheet according to [1] or [2], in which the base steel sheet contains, by mass %, Si: 2.5% to 4.5%, Al: 0.1% to 1.5%, and Mn: 0.2% to 4.0%.

[4] A method for manufacturing the non-oriented electrical steel sheet according to any one of [1] to [3], the method including: applying a surface treatment agent to a surface of the base steel sheet; and baking the base steel sheet to which the surface treatment agent is applied to form the insulation coating, in which the surface treatment agent contains the metal phosphate, 10.0 to 30.0 parts by mass of the organic resin in a case where an amount of the metal phosphate is 100.0 parts by mass, and 0 to 30.0 parts by mass of a curing agent in a case where the amount of the metal phosphate is 100.0 parts by mass, Inequation (1) is satisfied when the amount of the organic resin is Y parts by mass and the amount of the curing agent is Z parts by mass, and in the baking of the base steel sheet, a baking temperature is set to 200° C. or higher and lower than 260° C. and a heat treatment time is set to 15 to 30 seconds in a case where the amount of the surface treatment agent applied to the surface of the base steel sheet is less than 0.3 g/m², the baking temperature is set to 260° C. or higher and lower than 340° C. and the heat treatment time is set to 20 to 40 seconds in a case where the amount of the surface treatment agent applied is 0.3 g/m² to 1.2 g/m², and the baking temperature is set to 340° C. or higher and lower than 380° C. and the heat treatment time is set to 25 to 50 seconds in a case where the amount of the surface treatment agent applied is more than 1.2 g/m².

$$0.8\times(Y+Z)<0.3\times X<2.5\times(Y+Z) \quad (1)$$

Here, 100.0 which is the number of parts by mass of the metal phosphate is substituted for X.

Hereinafter, the non-oriented electrical steel sheet of the present embodiment will be described in detail.

[Configuration of Non-Oriented Electrical Steel Sheet]

FIG. 1 is a cross-sectional view of a non-oriented electrical steel sheet of the present embodiment in the sheet thickness direction. Referring to FIG. 1, a non-oriented electrical steel sheet 1 includes a base steel sheet 10 and insulation coatings 20. The insulation coatings 20 are formed on the surfaces of the base steel sheet 10. In FIG. 1, the insulation coatings 20 are respectively formed on the upper and lower surfaces of the base steel sheet 10. However, an insulation coating 20 may be formed on only either surface of the base steel sheet 10. Hereinafter, the base steel sheet 10 and the insulation coatings 20 will be described.

[Base Steel Sheet 10]

The base steel sheet 10 can be appropriately selected from well-known steel sheets used as the non-oriented electrical steel sheet 1. That is, the base steel sheet 10 is not particularly limited as long as it is a well-known steel sheet for use as the non-oriented electrical steel sheet 1.

The base steel sheet 10 has a chemical composition of basic elements and, as necessary, optional elements with the balance being Fe and impurities. The base steel sheet 10 has a chemical composition of, for example, the following elements. Hereinafter, unless otherwise specified, "%" means mass %.

[Basic Elements]

The base steel sheet 10 has a chemical composition of Si, Al, and Mn as basic elements. These elements will be described below.

Si: 2.5% to 4.5%

Silicon (Si) increases electrical resistance of steel and reduces eddy current loss. As a result, iron loss of the steel sheet decreases. Si also increases the strength of steel. If the amount of Si is less than 2.5%, the above-described effect cannot be sufficiently obtained. On the other hand, if the amount of Si is greater than 4.5%, the workability of steel deteriorates. Accordingly, the amount of Si is 2.5% to 4.5%. The lower limit of the amount of Si is preferably 2.6% and more preferably 2.7%. The upper limit of the amount of Si is preferably 4.3% and more preferably 4.2%.

Al: 0.1% to 1.5%

Aluminum (Al) increases electrical resistance of steel and reduces eddy current loss. As a result, iron loss of the steel sheet decreases. If the amount of Al is less than the above-described effect cannot be sufficiently obtained. On the other hand, if the amount of Al is greater than 1.5%, the saturation magnetic flux density deteriorates. Accordingly, the amount of Al is 0.1% to 1.5%. The lower limit of the amount of Al is preferably 0.15% and more preferably 0.2%. The upper limit of the amount of Al is preferably 1.4% and more preferably 1.3%.

Mn: 0.2% to 4.0%

Manganese (Mn) increases electrical resistance of steel and reduces eddy current loss. As a result, iron loss of the steel sheet decreases. Mn also suppresses formation of {111}<112> textures, which are not preferable for magnetic properties. If the amount of Mn is less than 0.2%, the above-described effect cannot be sufficiently obtained. On the other hand, if the amount of Mn is greater than 4.0%, the textures change and hysteresis loss deteriorates. Accordingly, the amount of Mn is 0.2% to 4.0%. The lower limit of the amount of Mn is preferably 0.3% and more preferably 0.4%. The upper limit of the amount of Mn is preferably 3.8% and more preferably 3.6%.

In the present embodiment, the balance of the chemical composition of the base steel sheet 10 consists of Fe and impurities. Here, impurities mean elements mixed in from ore or scraps as raw materials, a production environment, and the like when the base steel sheet 10 is industrially produced. Impurities are elements such as C, P, S and N, for example.

The chemical composition of the base steel sheet 10 can be measured through a well-known chemical analysis method. For example, the chemical composition of the base steel sheet 10 may be measured through Inductively Coupled Plasma-Atomic Emission Spectrometry (ICP-AES).

[Insulation Coatings 20]

The insulation coatings 20 are formed on the surfaces of the base steel sheet 10 as described above. Non-oriented electrical steel sheets 1 are processed into core blanks and then laminated to form a motor core. The insulation coatings 20 reduce eddy currents between steel sheets (core blanks) after lamination. As a result, eddy current loss in the motor core can be reduced.

Figure 2:
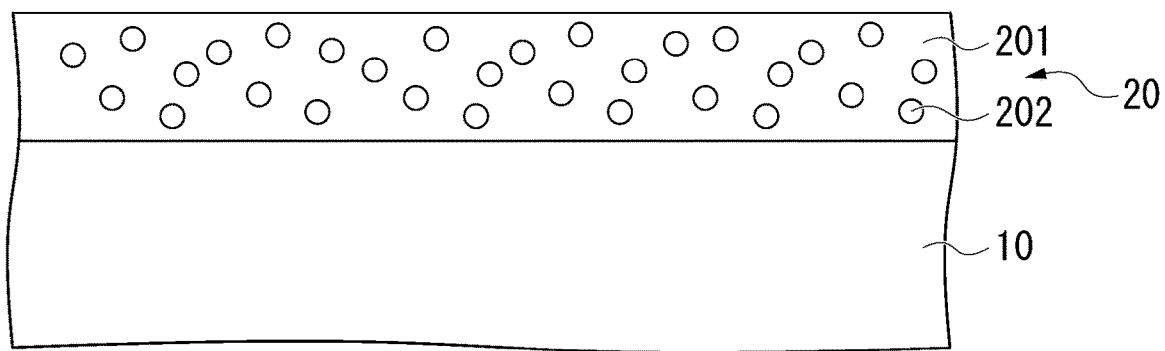
FIG. 2 is an enlarged cross-sectional view of an insulation coating 20 in FIG. 1.

FIG. 2 is an enlarged cross-sectional view of an insulation coating 20 in FIG. 1. Referring to FIG. 2, the insulation coating 20 contains a metal phosphate 201 and organic resins 202. The insulation coating 20 does not contain chromium oxide. The metal phosphate 201 and the organic resins 202 will be described below.

[Metal Phosphate 201]

The metal phosphate 201 functions as a binder for the insulation coating 20. The metal phosphate 201 is a solid content obtained by drying an aqueous solution (metal phosphate solution) containing phosphoric acid and metal ions. The type of phosphoric acid is not particularly limited, and well-known phosphoric acid can be used. Preferred phosphoric acid is one or more selected from the group consisting of orthophosphoric acid, metaphosphoric acid, and polyphosphoric acid.

Metal ions act on corrosion resistance and adhesion of the insulation coating 20. The types of metal ions are not particularly limited. Metal ions are, for example, one or more selected from the group consisting of Li, Al, Zn, Mg, Ca, Sr, Ti, Co, Mn, and Ni.

The metal phosphate preferably contains one or more selected from the group consisting of Al phosphate and Zn phosphate. The metal phosphate more preferably contains Al phosphate and Zn phosphate. Al phosphate effectively enhances adhesion of the insulation coating 20 with respect to the base steel sheet 10 and also increases heat resistance of the insulation coating 20. The Zn phosphate effectively improves corrosion resistance of the insulation coating 20. The metal phosphate may further contain, in addition to Al and Zn, the above-described metal elements other than Al and Zn.

[Organic Resins 202]

Referring to FIG. 2, the organic resins 202 are dispersed and contained in the metal phosphate 201 functioning as a binder. The organic resins 202 suppress coarse growth of the metal phosphate 201 and promote polycrystallization of the metal phosphate 201. A dense insulation coating 20 is formed by the organic resins 202.

The organic resins 202 are not particularly limited, and well-known organic resins can be used. Preferred organic resins 202 consist of one or more selected from the group consisting of an acrylic resin, a polystyrene resin, a vinyl acetate resin, an epoxy resin, a polyester resin, a polyurethane resin, a polyamide resin, a phenol resin, a melamine resin, a silicon resin, a polypropylene resin, and a polyethylene resin.

The organic resins 202 are preferably epoxy resins. Epoxy resins have exceptional insulation properties and corrosion resistance. The types of epoxy resins are not particularly limited. Epoxy resins are, for example, one or more selected from the group consisting of bisphenol types A, F, and B, alicyclic types, glycidyl ether types, glycidyl ester types, biphenyl types, naphthalene types, phenol novolac types, ortho-cresol novolac types, tetraphenylolethane types, and trishydroxyphenyl methane types.

More specifically, epoxy resins are, for example, one or more selected from the group consisting of bisphenol A diglycidyl ether, caprolactone ring-opening adducts of bisphenol A diglycidyl ether, bisphenol F-diglycidyl ether, bisphenol S-diglycidyl ether, novolac glycidyl ether, glycidyl ether dimerate, derivatives of glycidyl ethers, hexahydrophthalic acid polyglycidyl ester, dimer acid glycidyl ester, and derivatives of glycidyl esters.

If the organic resins 202 contain a fluororesin, the contact angle may increase and exceed 85°. In addition, in a case where a surface treatment agent contains a fluororesin, the fluororesin forms a coating on a surface, and the moisture content may exceed 0.03 wt % depending on baking conditions. For this reason, the amount of fluororesin in the insulation coating 20 is preferably limited to 0.5 parts by mass or less with respect to 100.0 parts by mass of the metal phosphate. Since it is unnecessary for the fluororesin to be contained, the amount of fluororesin may be 0 parts by mass.

[Method for Measuring Metal Phosphate 201 and Organic Resins 202 in Insulation Coating 20]

The metal phosphate 201 and the organic resins 202 in the insulation coating 20 can be measured through the following method. The gas generation behavior when the non-oriented electrical steel sheet 1 on which the insulation coating 20 is formed is heated is analyzed through pyrolysis-gas chromatograph/mass spectrometry (Py-GC/MS) (hereinafter referred to as a GC/MS method) to identify the presence or absence and the types of the organic resins 202. The GC/MS method described above may be used in combination with Fourier transform infrared spectroscopy (FT-IR) to identify organic resins.

Furthermore, chemical analysis is performed on the insulation coating 20 through energy dispersive X-ray spectroscopy (EDS) or ICP-AES, and if P and metal elements (such as Zn and Al) are detected, it is determined that a metal phosphate is contained in the insulation coating 20.

[Regarding Contact Angle of Water on Insulation Coating 20]

Furthermore, in the non-oriented electrical steel sheet 1 of the present embodiment, the contact angle of water on the insulation coating 20 is 55° to 85°. Here, the contact angle of water on the insulation coating 20 is measured through a sessile drop method in accordance with JIS R3257:1999.

In a case where the contact angle is less than 55°, dew condensation is likely to occur. For this reason, the corrosion resistance of the non-oriented electrical steel sheet 1 deteriorates and the varnish wettability also deteriorates. On the other hand, if the contact angle is greater than 85°, dew condensation is suppressed and the corrosion resistance of the non-oriented electrical steel sheet 1 is improved, but the varnish wettability deteriorates.

If the contact angle of water on the insulation coating 20 is 55° to 85°, the varnish wettability can be improved while improving the corrosion resistance by suppressing the occurrence of dew condensation. The lower limit of the contact angle of water on the insulation coating 20 is preferably 58°, more preferably 60°, still more preferably 62°, and still more preferably 65°. The upper limit of the contact angle of water on the insulation coating 20 is preferably 82°, more preferably 80°, still more preferably 78°, and still more preferably 75°.

[Regarding Moisture Content of Insulation Coating 20]

In the non-oriented electrical steel sheet 1 of the present embodiment, the moisture content of the insulation coating 20 is 0.003 wt % to 0.03 wt %. The moisture content in the insulation coating 20 can be measured through a thermobalance method. Specifically, it is possible to scrape off only the insulation coating with a cutter knife or the like, measure the weight loss at up to 100° C. using a commercially available thermal analyzer, and calculate the moisture content of the insulation coating.

If the moisture content of the insulation coating 20 is 0.003 wt % to 0.03 wt %, both the corrosion resistance and the varnish wettability can be achieved. In a case where the moisture content is less than 0.003 wt %, the varnish wettability of the non-oriented electrical steel sheet 1 deteriorates. This is because varnish wettability, especially the wettability of aqueous varnish, significantly deteriorates due to the presence of air in fine irregularities present on the surface of the insulation coating 20. On the other hand, in a case where the moisture content of the insulation coating 20 exceeds 0.03 wt %, the corrosion resistance of the non-oriented electrical steel sheet 1 deteriorates. This is because corrosion of the base steel sheet 10 progresses due to moisture in the insulation coating 20.

[Preferred Coating Thickness of Insulation Coating 20]

The coating thickness of the insulation coating 20 is not particularly limited. The preferred coating thickness of the insulation coating 20 is 0.05 to 1.60 μm. If the coating thickness is 0.05 to 1.60 μm, the insulation coating 20 exhibits superior insulation properties. However, even if the coating thickness of the insulation coating 20 is other than 0.05 to 1.60 μm, both exceptional corrosion resistance and exceptional varnish wettability can be achieved.

As described above, the non-oriented electrical steel sheet 1 of the present embodiment includes the base steel sheet 10 and insulation coatings 20. The insulation coatings 20 contain the metal phosphate 201 and the organic resins 202, the contact angle of water on the insulation coatings 20 is 55° to 85°, and the moisture content of the insulation coatings 20 is 0.003 wt % to 0.03 wt %. For this reason, both exceptional corrosion resistance and exceptional varnish wettability can be achieved.

[Manufacturing Method]

An example of a method for manufacturing the non-oriented electrical steel sheet 1 of the present embodiment will be described. The manufacturing method described below is an example for manufacturing the non-oriented electrical steel sheet 1. Accordingly, the non-oriented electrical steel sheet 1 may be produced through manufacturing methods other than the manufacturing method described below. However, the manufacturing method described below is a suitable example of the method for manufacturing the non-oriented electrical steel sheet 1.

An example of the method for manufacturing the non-oriented electrical steel sheet 1 of the present embodiment includes: a step of preparing a surface treatment agent which is a coating solution for forming an insulation coating 20 to apply the prepared surface treatment agent to the surface of a base steel sheet 10 (application step); and a step of baking the base steel sheet 10 to which the surface treatment agent is applied to form the insulation coating 20 (baking step). Hereinafter, each step will be described.

[Application Step]

In the application step, a surface treatment agent is applied to the surface of the base steel sheet 10. The application method is not particularly limited. Well-known application methods can be applied. The application methods are, for example, a roll coater method, a spray method, and a dip method.

[Regarding Surface Treatment Agent]

A surface treatment agent contains a metal phosphate and organic resins. The above-described metal phosphate and organic resins are used as the metal phosphate and the organic resins in the surface treatment agent. In a case where the surface treatment agent contains a fluororesin, the moisture content may not be satisfied even if baking conditions described below are satisfied. For this reason, the amount of fluororesin in the surface treatment agent is preferably limited to 0.5 parts by mass or less with respect to 100.0 parts by mass of the metal phosphate. Since it is unnecessary for the fluororesin to be contained, the amount of fluororesin may be 0 parts by mass.

When preparing a metal phosphate solution, it is preferable to mix at least any one of oxides of metal ions, carbonates, and hydroxides with various kinds of phosphoric acid such as orthophosphoric acid. A solvent for the surface treatment agent is preferably water.

The solid content concentration in the surface treatment agent is 5 mass % to 40 mass %. When the solid content is 5 mass % to 40 mass % and the baking conditions described below are satisfied, the moisture content of an insulation coating can be set to be within a range of 0.003 to 0.03 wt % and the contact angle can be set to be within a range of 55° to 85°. A more preferred solid content concentration is 8 mass % to 30 mass %. A still more preferred solid content concentration is 10 mass % to 25 mass %.

The surface treatment agent may further contain a curing agent. If the surface treatment agent contains a metal phosphate and organic resins, a curing reaction will proceed through a baking treatment described below. Accordingly, a curing agent is not essential. However, the surface treatment agent may contain a curing agent to further promote the curing reaction.

[Regarding Amount of Organic Resins in Surface Treatment Agent]

The amount of organic resins in a surface treatment agent is 10.0 to 30.0 parts by mass with respect to 100.0 parts by mass of a metal phosphate. In a case where the amount of organic resins is less than 10.0 parts by mass, coarsening of a metal phosphate cannot be sufficiently suppressed. In this case, adhesion of the insulation coating 20 with respect to the base steel sheet 10 is reduced. On the other hand, in a case where the amount of organic resins is greater than 30.0 parts by mass, the insulation coating contains an excess amount of organic resins. In this case, adhesion of the insulation coating 20 with respect to the base steel sheet 10 is reduced. Furthermore, varnish wettability deteriorates. Accordingly, the amount of organic resins in a surface treatment agent is 10.0 to 30.0 parts by mass with respect to 100 parts by mass of a metal phosphate.

The preferred lower limit of the amount of organic resins is preferably 12.0 parts by mass and more preferably 13.0 parts by mass with respect to 100.0 parts by mass of a metal phosphate. The upper limit of the amount of organic resins is preferably 28.0 parts by mass, more preferably 26.0 parts by mass, still more preferably 25.0 parts by mass, and still more preferably 24.0 parts by mass with respect to 100.0 parts by mass of a metal phosphate.

[Regarding Curing Agent]

A curing agent accelerates curing of organic resins. A curing agent can be selected from one or more selected from the group consisting of a polyamine curing agent, an acid anhydride-based curing agent, and a methylol group-containing precondensate.

A polyamine curing agent is, for example, one or more selected from the group consisting of an aliphatic polyamine, an alicyclic polyamine, an aromatic polyamine, polyamide polyamine, and a modified polyamine.

An acid anhydride-based curing agent is, for example, one or more selected from the group consisting of monofunctional acid anhydrides (such as phthalic anhydride, hexahydrophthalic anhydride, methyltetrahydrophthalic anhydride, methylhexahydrophthalic anhydride, methyl nadic anhydride, and chlorendic anhydride), bifunctional acid anhydrides (such as pyromellitic anhydride, benzophenone tetracarboxylic anhydride, ethylene glycol bis(anhydrotrimate), and methylcyclohexene tetracarboxylic acid anhydride), and free acid anhydrides (such as trimellitic anhydride and polyazelaic anhydride).

A methylol group-containing precondensate is, for example, one or more selected from the group consisting of novolac type or resol type phenolic resins, urea resins, and melamine resins.

The amount of curing agent in a surface treatment agent is 0 to 30.0 parts by mass with respect to 100.0 parts by mass of a metal phosphate. In a case where a surface treatment agent contains a curing agent, the curing agent promotes curing of organic resins. However, in a case where the amount of curing agent is greater than 30.0 parts by mass, adhesion of the insulation coating 20 with respect to the base steel sheet 10 is reduced. Furthermore, the contact angle is greater than 85°, and varnish wettability deteriorates. Accordingly, the amount of curing agent in a surface treatment agent is 0.5 to 30.0 parts by mass with respect to 100.0 parts by mass of a metal phosphate.

The lower limit of the amount of curing agent is preferably 0.5 parts by mass, more preferably 1.0 part by mass, and still more preferably 2.0 parts by mass with respect to 100.0 parts by mass of a metal phosphate. The upper limit of the amount of curing agent is 28.0 parts by mass, more preferably 26.0 parts by mass, and still more preferably 24.0 parts by mass with respect to 100.0 parts by mass of a metal phosphate.

[Regarding Formulation Proportion of Metal Phosphate, Organic Resins, and Curing Agent in Surface Treatment Agent]

In a surface treatment agent, Inequation (1) below is satisfied when the amount of organic resins with respect to 100 parts by mass of a metal phosphate is Y (parts by mass) and the amount of a curing agent with respect to 100 parts by mass of a metal phosphate is Z (parts by mass).

$$0.8 \times (Y+Z) < 0.3 \times X < 2.5 \times (Y+Z) \quad (1)$$

Here, 100.0 which is the number of parts by mass of the metal phosphate is substituted for X.

F0 is defined as 0.8×(Y+Z), F1 is defined as 0.3×X, and F2 is defined as 2.5×(Y+Z). Both the organic resins and the curing agent have an effect of increasing the contact angle on the insulation coating 20. On the other hand, the metal phosphate has an effect of decreasing the contact angle on the insulation coating 20. In a case where F0≥F1, the amount of the metal phosphate is too small with respect to the organic resins and the curing agent. In this case, the contact angle on the insulation coating formed becomes too large which is greater than 85°. On the other hand, in a case where F1≥F2, the amount of the metal phosphate is too large with respect to the organic resins and the curing agent. In this case, the contact angle on the insulation coating formed becomes too small which is less than 55°.

If F0<F1<F2, the ratio of the metal phosphate to the organic resins and the curing agent is appropriate. Accordingly, in this case, assuming that the manufacturing conditions described below are satisfied, the moisture content of the insulation coating is within the range of 0.003 to 0.03 wt % and the contact angle is within the range of 55° to 85°.

[Baking Step]

In the baking step, the base steel sheet 10 to which the surface treatment agent is applied is heated to form the insulation coating 20. In the baking step, the baking temperature is adjusted as follows according to the amount of surface treatment agent applied.

(1) The baking temperature is set to 200° C. or higher and lower than 260° C. in a case where the amount of surface treatment agent applied is less than 0.3 g/m².
(2) The baking temperature is set to 260° C. or higher and lower than 340° C. in a case where the amount of the surface treatment agent applied is 0.3 g/m 2 to 1.2 g/m².
(3) The baking temperature is set to 340° C. or higher and lower than 380° C. in a case where the amount of surface treatment agent applied is greater than 1.2 g/m².

In each of the conditions (1) to (3), when heated below the baking temperature, the insulation coating 20 becomes sticky. In this case, the corrosion resistance of the insulation coating 20 deteriorates. Furthermore, the contact angle of the insulation coating is less than 55°. For this reason, varnish wettability deteriorates.

On the other hand, in each of the conditions (1) to (3), when heated beyond the baking temperature, organic resins in the insulation coating 20 are oxidized and decomposed, and the inherent properties of the organic resins are lost. In this case, adhesion of the insulation coating with respect to the base steel sheet is reduced. Furthermore, the contact angle of the insulation coating 20 is greater than 85°. For this reason, varnish wettability deteriorates.

Regarding the baking time at a baking temperature, the baking temperature is set to 200° C. or higher and lower than 260° C. and the heat treatment time is set to 15 to 30 seconds in a case where the application amount is less than 0.3 g/m². The baking temperature is set to 260° C. or higher and lower than 340° C. and the heat treatment time is set to 20 to 40 seconds in a case where the amount of the surface treatment agent applied is 0.3 g/m 2 to 1.2 g/m². The baking temperature is set to 340° C. or higher and lower than 380° C. and the heat treatment time is set to 25 to 50 seconds in a case where the amount of the surface treatment agent applied is more than 1.2 g/m².

Through the above-described manufacturing process, a non-oriented electrical steel sheet 1 having a moisture content of 0.003 to 0.03 wt % in the insulation coating 20 and a contact angle of water of 55° to 85° is manufactured.

EXAMPLES

The effect of the non-oriented electrical steel sheet of the present embodiment will be described more specifically with reference to examples. The conditions in the following examples are examples of conditions adopted for confirming the feasibility and effect of the non-oriented electrical steel sheet of the present embodiment. Accordingly, the non-oriented electrical steel sheet of the present embodiment is not limited these examples of conditions.

A base steel sheet (non-oriented electrical steel sheet) having a sheet thickness of 0.25 mm and containing 3.4% of Si, 0.6% of Al, and 0.2% of Mn with the balance being Fe and impurities by mass % was prepared. An application step was performed on the prepared base steel sheet. Specifically, a surface treatment agent having a composition shown in Table 1 was applied to the surface of the base steel sheet using a rubber roll type applicator. The solid content concentration in the surface treatment agent was set to 5 mass % to 40 mass %, and water was used as a solvent.

TABLE 1

| Test No. | Metal phosphate (formulation amount X = 100 parts by mass) | Organic resin Type | Organic resin Formulation amount Y (parts by mass) | Curing agent Type | Curing agent Formulation amount Z (parts by mass) | F0 0.8 (Y+Z) | F1 0.3×X | F2 2.5 (Y+Z) | F0 < F1 | F1 < F2 | Addition of fluororesin |
|---|---|---|---|---|---|---|---|---|---|---|---|
| 1 | Al phosphate | A | 20 | — | 0 | 16 | 30 | 50 | YES | YES | |
| 2 | Al phosphate | B | 10 | a | 15 | 20 | 30 | 63 | YES | YES | |
| 3 | Al phosphate:5 + Mg phosphate: 5 | A | 30 | b | 3 | 26 | 30 | 83 | YES | YES | |
| 4 | Al phosphate:8 + Cu phosphate: 2 | B | 10 | c | 10 | 16 | 30 | 50 | YES | YES | |
| 5 | Al phosphate: 3 + Zn phosphate: 7 | C | 20 | a | 5 | 20 | 30 | 63 | YES | YES | |
| 6 | Al phosphate: 8 + Mn phosphate: 2 | B | 3 | b | 10 | 10 | 30 | 33 | YES | YES | |
| 7 | Al phosphate: 8 + Mo phosphate: 2 | C | 20 | a | 5 | 20 | 30 | 63 | YES | YES | |
| 8 | Mg phosphate: 6 + Mo phosphate: 4 | B | 3 | b | 10 | 10 | 30 | 33 | YES | YES | |
| 9 | Al phosphate: 3 + Zn phosphate: 7 | — | 0 | c | 3 | 2 | 30 | 8 | YES | NO | |
| 10 | Al phosphate: 5 + Mg phosphate: 5 | A | 1 | a | 10 | 9 | 30 | 28 | YES | NO | |
| 11 | Al phosphate | B | 10 | c | 0.6 | 8 | 30 | 27 | YES | NO | |
| 12 | Mg phosphate: 6 + Mo phosphate: 4 | B | 10 | b | 60 | 56 | 30 | 175 | NO | YES | |
| 13 | Al phosphate | C | 60 | a | 20 | 64 | 30 | 200 | NO | YES | |
| 14 | — | C | 100 | b | 40 | 112 | 0 | 350 | NO | YES | |
| 15 | Al phosphate | A | 20 | b | 5 | 20 | 30 | 63 | YES | YES | |
| 16 | Al phosphate: 5 + Mg phosphate: 5 | A | 20 | b | 5 | 20 | 30 | 63 | YES | YES | |
| 17 | Al phosphate: 8 + Mn phosphate: 2 | B | 20 | c | 3 | 18 | 30 | 58 | YES | YES | |
| 18 | Al phosphate: 8 + Mo phosphate: 2 | C | 20 | b | 5 | 20 | 30 | 63 | YES | YES | |
| 19 | Al phosphate: 3 + Zn phosphate: 7 | B | 20 | a | 15 | 28 | 30 | 88 | YES | YES | |

TABLE 1-continued

| Test No. | Metal phosphate (formulation amount X = 100 parts by mass) | Organic resin Type | Organic resin Formulation amount Y (parts by mass) | Curing agent Type | Curing agent Formulation amount Z (parts by mass) | F0 0.8 (Y + Z) | F1 0.3 X | F2 2.5 (Y + Z) | F0 < F1 | F1 < F2 | Addition of fluororesin |
|---|---|---|---|---|---|---|---|---|---|---|---|
| 20 | Al phosphate: 8 + Cu phosphate: 2 | B | 20 | b | 12 | 26 | 30 | 80 | YES | YES | |
| 21 | Al phosphate | A | 20 | a | 10 | 24 | 30 | 75 | YES | YES | D: 5 parts by mass |
| 22 | Al phosphate | A | 20 | a | 10 | 24 | 30 | 75 | YES | YES | E: 2 parts by mass |
| 23 | Al phosphate | A | 17 | a | 18 | 28 | 30 | 87.5 | YES | YES | |
| 24 | Al phosphate | A | 25 | b | 3 | 22 | 30 | 70 | YES | YES | |
| 25 | Al phosphate | A | 25 | c | 5 | 24 | 30 | 75 | YES | YES | |

The underline indicates that the result is out of the range.

The "metal phosphate (formulation amount X=100.0 parts by mass" column in Table 1 shows the types of metal phosphates contained in a surface treatment agent and the mass proportion of the metal phosphates. For example, the metal phosphate in Test No. 1 consists of Al phosphate. In Test No. 3, Al phosphate and Mg phosphate are contained as metal phosphates at a mass ratio of 5:5. In Test No. 4, Al phosphate and Cu phosphate are contained as metal phosphates at a mass ratio of 8:2.

A to E of "type" in the "organic resin" column in Table 1 are as follows.

A: An epoxy resin-amine adduct formed by dissolving a bisphenol A-type epoxy resin having an epoxy equivalent of 980 in butyl cellosolve and reacting it with N-methylethanolamine at 90° C.

B: Epoxy resin emulsion obtained by modifying and emulsifying a bisphenol A-type epoxy resin having an epoxy equivalent of 200 using polyoxyethylene benzylated phenyl ether C: Acrylic modified epoxy resin emulsion formed by reacting methacrylic acid and ethyl acrylate with a bisphenol A-type epoxy resin having an epoxy equivalent of 5,000

D: Polytetrafluoroethylene

E: Chlorotrifluoroethylene-hydroxydodecyl vinyl ether copolymer

The "formulation amount Y (parts by mass)" in the "organic resin" column in Table 1 shows the amount (parts by mass) of organic resin with respect to 100.0 parts by mass of the metal phosphates. In Test No. 14, the amount of organic resin was 100.0 parts by mass because no metal phosphate was contained.

a to c of "type" in the "curing agent" column in Table 1 are as follows.

a: A polyamide resin dissolved and dispersed in water b: An epoxy resin-amine addition curing agent formed by adding a reaction mixture obtained by reacting dioxane, methyl ethyl ketone oxime, and 2,4-tolylene diisocyanate with each other and forming partially blocked diisocyanate to an epoxy resin-amine adduct at 60° C.

c: Trimethylol Benzoguanamine

The "formulation amount Z (parts by mass)" in the "curing agent" column in Table 1 shows the amount (parts by mass) of curing agent with respect to 100.0 parts by mass of the metal phosphates. Test No. 14 shows the amount (parts by mass) of curing agent in a case where the amount of organic resin is 100.0 parts by mass.

Table 1 also shows the F0 value, the F1 value, and the F2 value. "YES" in the "F0<F1" and "F1<F2" columns in Table 1 means that the inequation in the corresponding column is satisfied, and "NO" therein means that the inequation in the corresponding column is not satisfied.

The amount of surface treatment agent applied for each test number is shown in Table 2.

TABLE 2

| Test No. | Application amount (g/m²) | Baking temperature (° C.) | Baking time (seconds) | Contact angle (°) | Moisture content (wt %) | Insulation properties | Adhesion | Corrosion resistance | Elution resistance | Varnish wettability | Remarks |
|---|---|---|---|---|---|---|---|---|---|---|---|
| 1 | 1.2 | 315 | 30 | 72 | 0.008 | 4 | 3 | 7 | 75 | 3 | Invention example |
| 2 | 0.8 | 300 | 25 | 83 | 0.012 | 3 | 4 | 9 | 96 | 3 | Invention example |
| 3 | 0.8 | 300 | 25 | 78 | 0.009 | 4 | 4 | 8 | 18 | 3 | Invention example |
| 4 | 0.6 | 300 | 25 | 63 | 0.006 | 3 | 3 | 7 | 28 | 4 | Invention example |
| 5 | 0.8 | 310 | 25 | 65 | 0.025 | 3 | 3 | 7 | 90 | 4 | Invention example |
| 6 | 0.3 | 270 | 25 | 60 | 0.011 | 3 | 3 | 8 | 34 | 4 | Invention example |
| 7 | 0.5 | 280 | 30 | 81 | 0.018 | 3 | 4 | 8 | 10 | 3 | Invention example |
| 8 | 1.4 | 345 | 45 | 58 | 0.028 | 4 | 3 | 8 | 53 | 4 | Invention example |
| 9 | 1.2 | 320 | 45 | 30 | 0.016 | 4 | 2 | 3 | 125 | 2 | Comparative example |

TABLE 2-continued

| Test No. | Application amount (g/m²) | Baking temperature (° C.) | Baking time (seconds) | Contact angle (°) | Moisture content (wt %) | Insulation properties | Adhesion | Corrosion resistance | Elution resistance | Varnish wettability | Remarks |
|---|---|---|---|---|---|---|---|---|---|---|---|
| 10 | 1.1 | 325 | 40 | <u>45</u> | 0.022 | 4 | 2 | 4 | 110 | 2 | Comparative example |
| 11 | 0.8 | 310 | 25 | <u>52</u> | 0.003 | 3 | 3 | 3 | 88 | 2 | Comparative example |
| 12 | 0.7 | 310 | 25 | <u>88</u> | 0.004 | 3 | 2 | 6 | 23 | 2 | Comparative example |
| 13 | 0.8 | 310 | 25 | <u>89</u> | 0.021 | 3 | 2 | 6 | 106 | 1 | Comparative example |
| 14 | 0.6 | 265 | 25 | <u>97</u> | 0.003 | 3 | 1 | 5 | — | 1 | Comparative example |
| 15 | 0.2 | <u>270</u> | 10 | <u>95</u> | 0.004 | 1 | 2 | 3 | 100 | 1 | Comparative example |
| 16 | 0.6 | <u>250</u> | 20 | <u>51</u> | 0.012 | 3 | 3 | 3 | 154 | 2 | Comparative example |
| 17 | 1.1 | <u>360</u> | 40 | <u>93</u> | 0.01 | 3 | 1 | 6 | 120 | 1 | Comparative example |
| 18 | 1.6 | <u>300</u> | 50 | <u>52</u> | 0.02 | 3 | 3 | 4 | 186 | 2 | Comparative example |
| 19 | 1.6 | <u>390</u> | 50 | <u>92</u> | 0.006 | 3 | 2 | 6 | 123 | 1 | Comparative example |
| 20 | 0.2 | <u>180</u> | 15 | <u>45</u> | 0.003 | 2 | 3 | 3 | 141 | 1 | Comparative example |
| 21 | 1.3 | <u>330</u> | 30 | <u>88</u> | 0.02 | 3 | 3 | 7 | 78 | 1 | Comparative example |
| 22 | 1.1 | 280 | 25 | 82 | <u>0.051</u> | 2 | 2 | 4 | 134 | 1 | Comparative example |
| 23 | 1.2 | 325 | 30 | 81 | 0.005 | 4 | 3 | 9 | 65 | 3 | Invention example |
| 24 | 1.1 | 260 | <u>15</u> | 55 | <u>0.063</u> | 2 | 2 | 3 | 141 | 3 | Comparative example |
| 25 | 0.4 | 320 | <u>60</u> | 67 | <u>0.002</u> | 2 | 2 | 7 | 14 | 2 | Comparative example |

The underline indicates that the result is out of the range.

A baking treatment was performed on a base steel sheet to which a surface treatment agent was applied. The baking temperature for each test number is shown in Table 2. The baking time was 60 seconds in each case. Through the above steps, a non-oriented electrical steel sheet having an insulation coating formed on the surface of a base steel sheet was manufactured.

[Evaluation Test]

A moisture content measurement test, a contact angle measurement test, an insulation property evaluation test, an adhesion evaluation test, a corrosion resistance evaluation test, an elution resistance evaluation test, and a varnish wettability evaluation test were carried out for each manufactured non-oriented electrical steel sheet.

[Moisture Content Measurement Test]

10 mg of an insulation coating of a non-oriented electrical steel sheet of each test number was scraped off with a cutter knife, the weight loss at room temperature (25° C.) to 100° C. was measured using TG/DTA 2000SA manufactured by Bruker AXS at a heating rate of 10° C./min in a heating atmosphere of air 300 ml/minute, and the measured weight loss was divided by the amount of coating applied to obtain a moisture content. The obtained moisture content is shown in Table 2.

[Contact Angle Measurement Test]

The contact angle (°) of an insulation coating on a non-oriented electrical steel sheet of each test number was measured through a sessile drop method in accordance with JIS R3257:1999. The obtained contact angle (°) is shown in Table 2.

[Insulation Property Evaluation Test]

The insulation properties of a non-oriented electrical steel sheet of each test number were evaluated through the following method. The interlayer resistance of a non-oriented electrical steel sheet of each test number was measured in accordance with JIS C2550-4:2019. The insulation properties were evaluated as follows based on the obtained interlayer resistance value.

4 (double circle): Interlayer resistance is 30 Ω·cm²/sheet or more 3 (circle): Interlayer resistance is 10 Ω·cm²/sheet or more and less than 30 Ω·cm²/sheet 2 (triangle): Interlayer resistance is 3 Ω·cm²/sheet or more and less than 10 Ω·cm²/sheet 1 (cross): Interlayer resistance is less than 3 Ω·cm²/sheet The obtained evaluation results for the insulation properties are shown in the "insulation properties" column in Table 2. Evaluations 4 and 3 were considered to be acceptable (exceptional insulation properties).

[Adhesion Evaluation Test]

The adhesion of a non-oriented electrical steel sheet of each test number was evaluated through the following method. A steel sheet sample having a width of 30 mm and a length of 300 mm was collected from a non-oriented electrical steel sheet of each test number. The steel sheet sample was subjected to stress relief annealing. In the stress relief annealing, the annealing temperature was set to 800° C. and the annealing time was set to 2 hours in a nitrogen stream. Adhesive tape was attached on an insulation coating of each steel sheet sample after stress relief annealing. Each steel sheet sample with the adhesive tape attached was wound around a metal rod with a diameter of 10 mm. Thereafter, the steel sheet sample was separated from the metal rod. That is, bending with a diameter of 10 mm was imparted to the steel sheet sample. Thereafter, the adhesive tape was peeled off from the steel sheet sample, and the proportion (area proportion) of the insulation coating remaining without being peeled off from the base steel sheet was measured. The adhesion was evaluated as follows based on the obtained area proportion.

4 (double circle): The area proportion of the remaining insulation coating was 100%. That is, the insulation coating was not peeled off.

3 (circle): The area proportion of the remaining insulation coating was 90% or more and less than 100%.

2 (triangle): The area proportion of the remaining insulation coating was 70% or more and less than 90%.

1 (cross): The area proportion of the remaining insulation coating was less than 70%.

The obtained evaluation results for the adhesion are shown in the "adhesion" column in Table 2. Evaluations 4 and 3 were considered to be acceptable (exceptional adhesion).

[Corrosion Resistance Evaluation Test]

The corrosion resistance of a non-oriented electrical steel sheet of each test number was evaluated through the following method. A steel sheet sample having a width of 30 mm and a length of 300 mm was collected from a non-oriented electrical steel sheet of each test number. A 5% NaCl aqueous solution was naturally dropped onto each steel sheet sample in an atmosphere of 35° C. for 7 hours in accordance with a salt spray test described in JIS Z2371: 2015. Thereafter, the area proportion of a rusted region (hereinafter referred to as a rust area proportion) on the surface of each steel sheet sample was obtained. The corrosion resistance was evaluated by the following 10-point evaluation according to the obtained rust area proportion.

10: Rust area proportion is 0%
9: Rust area proportion is 0.10% or less
8: Rust area proportion is greater than 0.10% and 0.25% or less
7: Rust area proportion is greater than 0.25% and 0.50% or less
6: Rust area proportion is greater than 0.50% and 1.00% or less
5: Rust area proportion is greater than 1.00% and 2.50% or less
4: Rust area proportion is greater than 2.50% and 5.00% or less
3: Rust area proportion is greater than 5.00% and 10.00% or less
2: Rust area proportion is greater than 10.00% and 25.00% or less
1: Rust area proportion is greater than 25.00% and 50.00% or less The obtained corrosion resistance is shown in the "corrosion resistance" column in Table 2. A score of 5 or higher was considered to be acceptable (exceptional corrosion resistance).

[Elution Resistance Evaluation Test]

The elution resistance of a non-oriented electrical steel sheet of each test number was evaluated through the following method. A steel sheet sample having a width of 30 mm and a length of 300 mm was collected from a non-oriented electrical steel sheet of each test number. The collected steel sheet sample was divided into 5 parts, and the steel sheet sample was boiled in boiling pure water for 10 minutes. The amount of phosphoric acid eluted in the aqueous solution after boiling was measured. Specifically, after cooling the aqueous solution after boiling, the aqueous solution was diluted with pure water, and the concentration of phosphoric acid in the aqueous solution was measured through ICP-AES. The amount of phosphoric acid eluted (mg/m$^2$) was obtained from the dilution rate. The results are shown in the "elution resistance" column in Table 2. If the amount of phosphoric acid eluted was less than 140 mg/m$^2$, it was considered as acceptable (exceptional elution resistance).

[Varnish Wettability Evaluation Test]

The varnish wettability of a non-oriented electrical steel sheet of each test number was evaluated through the following method. Two steel sheet samples having a width of 25.6 mm and a length of 100 mm were collected from a non-oriented electrical steel sheet of each test number. 0.4 ml of varnish for unsaturated polyester electric wires is added dropwise to a center portion of one steel sheet sample in the longitudinal direction in a range of 25.6 mm in width and 20 mm in length (hereinafter referred to as a lapped region). After the dropwise addition, the other steel sheet sample is superposed on the lapped region. While the superposed steel sheet samples are pressurized with a pressing force of 10 MPa, they are heated to 150° C. and held for 1 hour. After holding, the shear adhesive strength (MPa) of the superposed steel sheet samples was measured in accordance with JIS K 6850:1999. Evaluation was made as follows according to the obtained shear adhesive strength (MPa).

4 (double circle): The shear adhesive strength is greater than 8 MPa.
3 (circle): The shear adhesive strength is greater than 2 MPa and 8 MPa or less.
2 (triangle): The shear adhesive strength is greater than 1 MPa and 2 MP or less.
1 (cross): The shear adhesive strength is less than 1 MPa.

The obtained evaluation results for the varnish wettability are shown in the "varnish wettability" column in Table 2. Evaluations 4 and 3 were considered to be acceptable.

[Evaluation Results]

The evaluation results are shown in Table 2. Referring to Table 2, the insulation coatings of the non-oriented electrical steel sheets of Test Nos. 1 to 8 and 23 contained metal phosphates and an organic resin. Furthermore, F0<F1<F2 was satisfied for the surface treatment agents. For this reason, the contact angles of water on the insulation coatings were 55° to 85°. As a result, insulation properties and adhesion are exceptional, and both exceptional corrosion resistance and exceptional varnish wettability can be achieved.

On the other hand, the insulation coating in Test No. 9 did not contain any of the organic resins A to C. For this reason, although the insulation properties are exceptional, the adhesion was low. Furthermore, F1 was greater than or equal to F2, and the contact angle was less than 55°. For this reason, the corrosion resistance deteriorated and the varnish wettability also deteriorated.

In Test No. 10, F1 was greater than or equal to F2. For this reason, although the insulation properties are exceptional, the adhesion was low. Furthermore, F1 was greater than or equal to F2, and therefore, the contact angle was less than 55°. For this reason, the corrosion resistance deteriorated and the varnish wettability also deteriorated.

In Test No. 11, F1 was greater than or equal to F2, and therefore, the contact angle was less than 55°. For this reason, the corrosion resistance deteriorated and the varnish wettability also deteriorated.

In Test No. 12, the amount of curing agent with respect to the metal phosphates in the surface treatment agent was too large. For this reason, although the insulation properties are exceptional, the adhesion was low. Furthermore, the contact angle was greater than 85°. For this reason, the varnish wettability deteriorated.

In Test No. 13, F0 was greater than or equal to F1. For this reason, although the insulation properties are exceptional, the adhesion was low. Furthermore, F0 was greater than or equal to F1, and therefore, the contact angle was greater than 85°. For this reason, the varnish wettability deteriorated.

In Test No. 14, the insulation coating did not contain a metal phosphate and constituted of only an organic resin. For this reason, although the insulation properties are exceptional, the adhesion was low. Furthermore, F0 was greater than or equal to F1, and therefore, the contact angle was greater than 85°. For this reason, the varnish wettability also deteriorated.

In Test No. 15, the amount of surface treatment agent adhered was 0.2 g/m$^2$, and the baking temperature did not satisfy the condition (1) in the baking step and was 260° C. or higher. For this reason, excessive oxidative decomposition of the organic resin occurred. As a result, the insulation properties were low and the adhesion and corrosion resistance were also low. Furthermore, the contact angle was greater than 85°. For this reason, the varnish wettability deteriorated.

In Test No. 16, the amount of surface treatment agent adhered was 0.6 g/m$^2$, and the baking temperature was lower than the lower limit (260° C.) of the condition (2) in the baking step. For this reason, the insulation coating became sticky, and the contact angle was less than 55°. For this reason, although the insulation properties and adhesion were exceptional, the corrosion resistance, elution resistance, and varnish wettability were low.

In Test No. 17, the amount of surface treatment agent adhered was 1.1 g/m$^2$, and the baking temperature was higher than the upper limit (340° C.) of the condition (2) in the baking step. For this reason, excessive oxidative decomposition of the organic resin proceeded. As a result, although the insulation properties and corrosion resistance were exceptional due to the large adhesion amount, the adhesion was low. Furthermore, the contact angle was greater than 85°. For this reason, the varnish wettability deteriorated.

In Test No. 18, the amount of surface treatment agent adhered was 1.6 g/m$^2$, and the baking temperature was lower than the lower limit (340° C.) of the condition (3) in the baking step. For this reason, the insulation coating became sticky, and the contact angle was less than 55°. For this reason, although the insulation properties and adhesion were exceptional, the corrosion resistance, elution resistance, and varnish wettability were low.

In Test No. 19, the amount of surface treatment agent adhered was 1.6 g/m$^2$, and the baking temperature was higher than the upper limit (380° C.) of the condition (3) in the baking step. For this reason, excessive oxidative decomposition of the organic resin proceeded. As a result, although the insulation properties and corrosion resistance were exceptional due to the large adhesion amount, the adhesion was low. Furthermore, the contact angle was greater than 85°. For this reason, the varnish wettability deteriorated.

In Test No. 20, the amount of surface treatment agent adhered was 0.2 g/m$^2$, and the baking temperature was lower than the lower limit (200° C.) of the condition (1) in the baking step. For this reason, the insulation coating became sticky, and the contact angle was less than 55°. For this reason, the insulation properties were low, and the corrosion resistance and varnish wettability al so deteriorated.

In Test No. 21, 5 parts by mass of a fluororesin was added, the amount of surface treatment agent adhered was 1.3 g/m$^2$, and the baking temperature was lower than the lower limit (340° C.) of the condition (3) in the baking step. For this reason, the contact angle was greater than 85°. For this reason, the varnish wettability deteriorated.

In Test No. 22, since 2 parts by mass of a fluororesin was added, the moisture content of the insulation coating was greater than 0.03 wt %. For this reason, the insulation properties, the adhesion, and varnish wettability were reduced.

In Test No. 24, the amount of surface treatment agent adhered was 1.1 g/m$^2$, and the heat treatment time was longer than 40 seconds. For this reason, the moisture content of the insulation coating was greater than 0.03 wt %. For this reason, the insulation properties and adhesion were low.

In Test No. 25, the amount of surface treatment agent adhered was 0.4 g/m$^2$, and the heat treatment time was shorter than 20 seconds. For this reason, the moisture content of the insulation coating was less than 0.003 wt %. For this reason, the insulation properties, the adhesion, and varnish wettability were reduced.

The embodiment of the present disclosure has been described above. However, the above-described embodiment is merely an example for implementing the present disclosure. Accordingly, the present disclosure is not limited to the above-described embodiment, and the above-described embodiment can be appropriately modified within the scope not departing from the gist thereof.

BRIEF DESCRIPTION OF THE REFERENCE SYMBOLS

1 Non-oriented electrical steel sheet
10 Base steel sheet
20 Insulation coating
201 Metal phosphate
202 Organic resin

The invention claimed is:
1. A non-oriented electrical steel sheet comprising:
a base steel sheet; and
an insulation coating formed on a surface of the base steel sheet,
wherein the insulation coating contains a metal phosphate and an organic resin,
wherein a moisture content of the insulation coating is 0.003 to 0.03 wt %, and
wherein a contact angle of water on the insulation coating is 55° to 85°.
2. The non-oriented electrical steel sheet according to claim 1,
wherein the metal phosphate contains one or more selected from the group consisting of Al phosphate and Zn phosphate, and
wherein the organic resin contains an epoxy resin as a main component.
3. The non-oriented electrical steel sheet according to claim 1,
wherein the base steel sheet contains, by mass %,
Si: 2.5% to 4.5%,
Al: 0.1% to 1.5%, and
Mn: 0.2% to 4.0%.
4. The non-oriented electrical steel sheet according to claim 2,
wherein the base steel sheet contains, by mass %,
Si: 2.5% to 4.5%,
Al: 0.1% to 1.5%, and
Mn: 0.2% to 4.0%.

5. A method for manufacturing the non-oriented electrical steel sheet according to claim 1, the method comprising:
applying a surface treatment agent to a surface of the base steel sheet; and
heating the base steel sheet to which the surface treatment agent is applied to form the insulation coating,
wherein the surface treatment agent contains
the metal phosphate,
10.0 to 30.0 parts by mass of the organic resin in a case where an amount of the metal phosphate is 100.0 parts by mass, and
0 to 30.0 parts by mass of a curing agent in a case where the amount of the metal phosphate is 100.0 parts by mass,
wherein a solid content concentration in the surface treatment agent is 5 mass % to 40 mass %,
wherein equation (1) is satisfied when the amount of the organic resin is Y parts by mass and the amount of the curing agent is Z parts by mass, and
wherein, in the heating of the base steel sheet,
a baking temperature is set to 200° C. or higher and lower than 260° C. and a heat treatment time is set to 15 to 30 seconds in a case where the amount of the surface treatment agent applied to the surface of the base steel sheet is less than 0.3 g/m$^2$,
the baking temperature is set to 260° C. or higher and lower than 340° C. and the heat treatment time is set to 20 to 40 seconds in a case where the amount of the surface treatment agent applied is 0.3 g/m$^2$ to 1.2 g/m$^2$, and
the baking temperature is set to 340° C. or higher and lower than 380° C. and the heat treatment time is set to 25 to 50 seconds in a case where the amount of the surface treatment agent applied is more than 1.2 g/m$^2$, $$0.8\times(Y+Z)<0.3\times X<2.5\times(Y+Z) \quad (1)$$

where 100 which is the number of parts by mass of the metal phosphate is substituted for X.

6. A method for manufacturing the non-oriented electrical steel sheet according to claim 2, the method comprising:
applying a surface treatment agent to a surface of the base steel sheet; and
heating the base steel sheet to which the surface treatment agent is applied to form the insulation coating,
wherein the surface treatment agent contains
the metal phosphate,
10.0 to 30.0 parts by mass of the organic resin in a case where an amount of the metal phosphate is 100.0 parts by mass, and
0 to 30.0 parts by mass of a curing agent in a case where the amount of the metal phosphate is 100.0 parts by mass,
wherein a solid content concentration in the surface treatment agent is 5 mass % to 40 mass %,
wherein equation (1) is satisfied when the amount of the organic resin is Y parts by mass and the amount of the curing agent is Z parts by mass, and
wherein, in the heating of the base steel sheet,
a baking temperature is set to 200° C. or higher and lower than 260° C. and a heat treatment time is set to 15 to 30 seconds in a case where the amount of the surface treatment agent applied to the surface of the base steel sheet is less than 0.3 g/m$^2$,
the baking temperature is set to 260° C. or higher and lower than 340° C. and the heat treatment time is set to 20 to 40 seconds in a case where the amount of the surface treatment agent applied is 0.3 g/m$^2$ to 1.2 g/m$^2$, and
the baking temperature is set to 340° C. or higher and lower than 380° C. and the heat treatment time is set to 25 to 50 seconds in a case where the amount of the surface treatment agent applied is more than 1.2 g/m$^2$, $$0.8\times(Y+Z)<0.3\times X<2.5\times(Y+Z) \quad (1)$$

where 100 which is the number of parts by mass of the metal phosphate is substituted for X.

7. A method for manufacturing the non-oriented electrical steel sheet according to claim 3, the method comprising:
applying a surface treatment agent to a surface of the base steel sheet; and
heating the base steel sheet to which the surface treatment agent is applied to form the insulation coating,
wherein the surface treatment agent contains
the metal phosphate,
10.0 to 30.0 parts by mass of the organic resin in a case where an amount of the metal phosphate is 100.0 parts by mass, and
0 to 30.0 parts by mass of a curing agent in a case where the amount of the metal phosphate is 100.0 parts by mass,
wherein a solid content concentration in the surface treatment agent is 5 mass % to 40 mass %,
wherein equation (1) is satisfied when the amount of the organic resin is Y parts by mass and the amount of the curing agent is Z parts by mass, and
wherein, in the heating of the base steel sheet,
a baking temperature is set to 200° ° C. or higher and lower than 260° ° C. and a heat treatment time is set to 15 to 30 seconds in a case where the amount of the surface treatment agent applied to the surface of the base steel sheet is less than 0.3 g/m$^2$,
the baking temperature is set to 260° C. or higher and lower than 340° C. and the heat treatment time is set to 20 to 40 seconds in a case where the amount of the surface treatment agent applied is 0.3 g/m$^2$ to 1.2 g/m$^2$, and
the baking temperature is set to 340° C. or higher and lower than 380° C. and the heat treatment time is set to 25 to 50 seconds in a case where the amount of the surface treatment agent applied is more than 1.2 g/m$^2$, $$0.8\times(Y+Z)<0.3\times X<2.5\times(Y+Z) \quad (1)$$

where 100 which is the number of parts by mass of the metal phosphate is substituted for X.

8. A method for manufacturing the non-oriented electrical steel sheet according to claim 4, the method comprising:
applying a surface treatment agent to a surface of the base steel sheet; and
heating the base steel sheet to which the surface treatment agent is applied to form the insulation coating,
wherein the surface treatment agent contains
the metal phosphate,
10.0 to 30.0 parts by mass of the organic resin in a case where an amount of the metal phosphate is 100.0 parts by mass, and
0 to 30.0 parts by mass of a curing agent in a case where the amount of the metal phosphate is 100.0 parts by mass,
wherein a solid content concentration in the surface treatment agent is 5 mass % to 40 mass %, wherein equation (1) is satisfied when the amount of the organic resin is Y parts by mass and the amount of the curing agent is Z parts by mass, and wherein, in the heating of the base steel sheet,
- a baking temperature is set to 200° C. or higher and lower than 260° C. and a heat treatment time is set to 15 to 30 seconds in a case where the amount of the surface treatment agent applied to the surface of the base steel sheet is less than 0.3 g/m$^2$,
- the baking temperature is set to 260° C. or higher and lower than 340° C. and the heat treatment time is set to 20 to 40 seconds in a case where the amount of the surface treatment agent applied is 0.3 g/m$^2$ to 1.2 g/m$^2$, and
- the baking temperature is set to 340° C. or higher and lower than 380° C. and the heat treatment time is set to 25 to 50 seconds in a case where the amount of the surface treatment agent applied is more than 1.2 g/m$^2$, $$0.8 \times (Y+Z) < 0.3 \times X < 2.5 \times (Y+Z) \quad (1)$$

where 100 which is the number of parts by mass of the metal phosphate is substituted for X.

* * * * *